June 27, 1967
F. G. LAMB
3,327,751
CRINKLE CUT APPARATUS
Filed Aug. 14, 1964
4 Sheets-Sheet 1
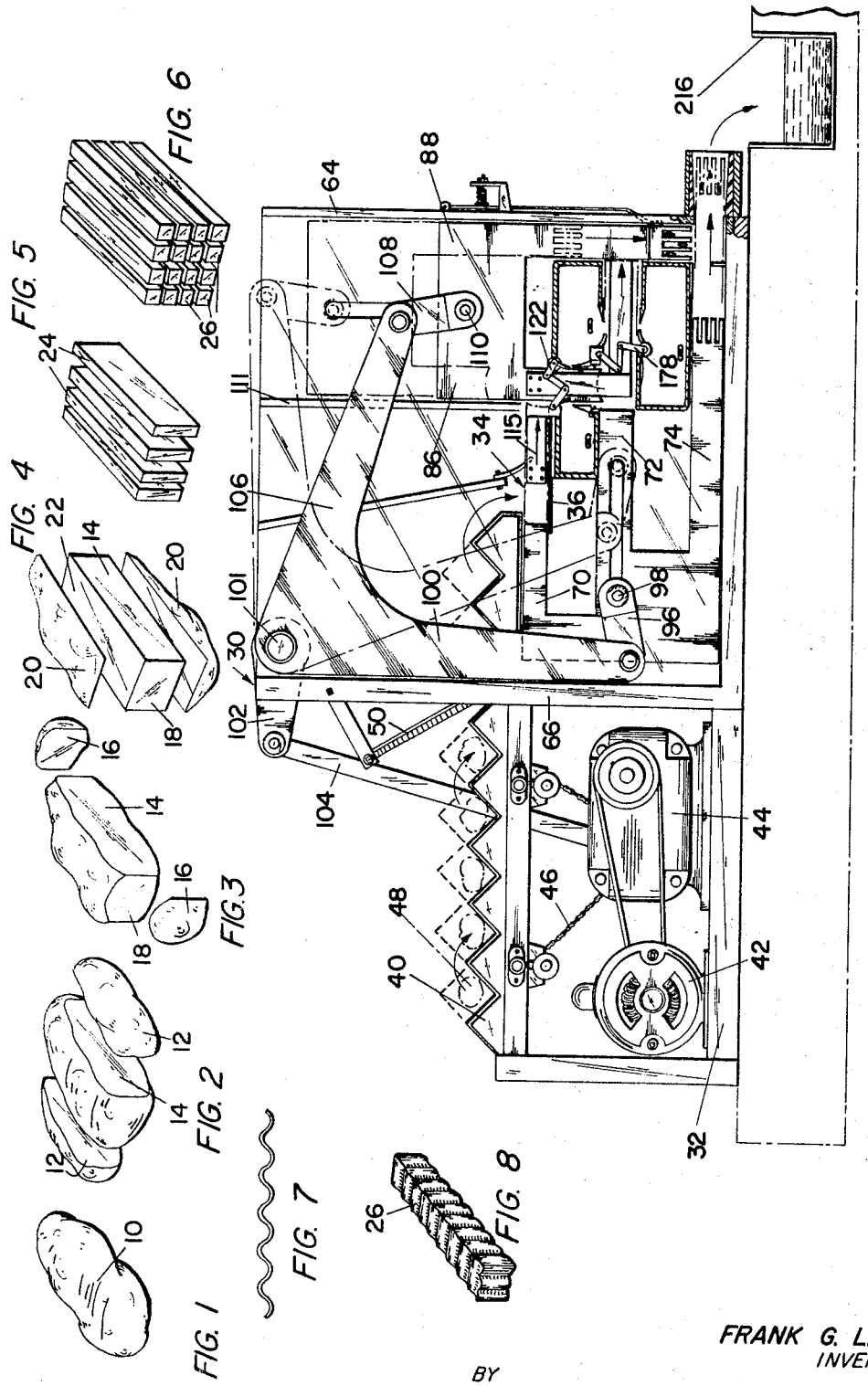
FRANK G. LAMB
INVENTOR.
BY
BUCKHORN, BLORE, KLARQUIST & SPARKMAN
ATTORNEYS

FRANK G. LAMB
INVENTOR.
BY
BUCKHORN, BLORE, KLARQUIST & SPARKMAN
ATTORNEYS

June 27, 1967 F. G. LAMB 3,327,751
CRINKLE CUT APPARATUS
Filed Aug. 14, 1964 4 Sheets-Sheet 3

FRANK G. LAMB
INVENTOR.
BY
BUCKHORN, BLORE, KLARQUIST & SPARKMAN
ATTORNEYS

June 27, 1967 F. G. LAMB 3,327,751
CRINKLE CUT APPARATUS
Filed Aug. 14, 1964 4 Sheets-Sheet 4
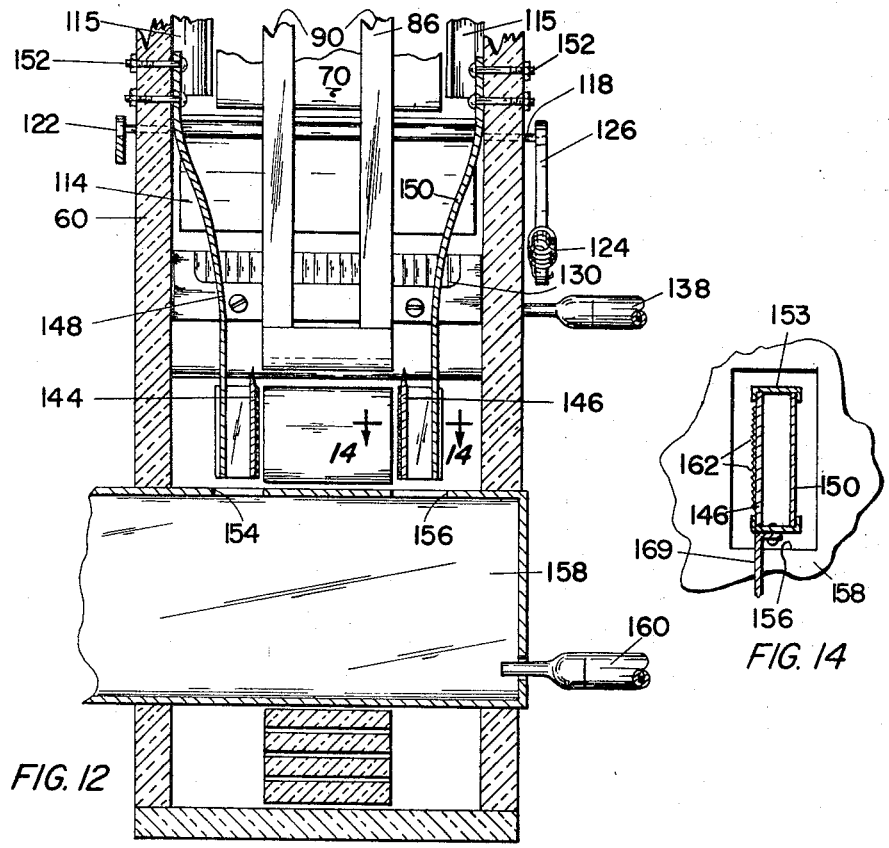
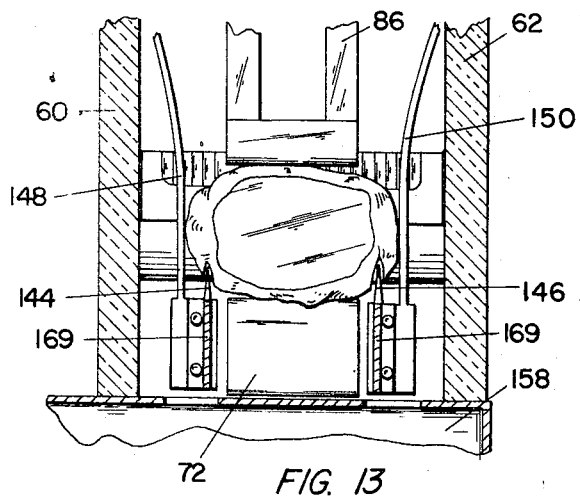
FRANK G. LAMB
INVENTOR.
BY
BUCKHORN, BLORE, KLARQUIST & SPARKMAN
ATTORNEYS

United States Patent Office 3,327,751
Patented June 27, 1967

3,327,751
CRINKLE CUT APPARATUS
Frank G. Lamb, Oswego, Oreg., assignor to Lamb-Weston, Inc., Portland, Oreg., a corporation of Oregon
Filed Aug. 14, 1964, Ser. No. 389,665
8 Claims. (Cl. 146—78)

The present invention relates to a mechanism for cutting of vegetable products and more particularly to a mechanism for slicing potatoes for French frying.

The instant invention is a continuation-in-part of the application of Frank G. Lamb, Ser. No. 339,967, filed Jan. 24, 1964, now Patent No. 3,273,617, and the application of Frank G. Lamb, Ser. No. 258,822, filed Feb. 15, 1963, now Patent No. 3,217,768.

Potatoes have long been prepared for French frying by slicing them longitudinally into elongate smooth sided strips. More recently demand has arisen for strips having wavy or sinuous surfaces known in the trade as "crinkle cut" strips. Such a surface is desired not only because of the attractive appearance, but also because the greater surface permits the potato to be fried at a faster rate. Restaurants, hotels and like users of large quantities of French fried potatoes at the present time frequently utilize frozen sliced potatoes partialy cooked by a potato processor. These need only be heated or further cooked for a few minutes to ready them for consumption. Because of the improved appearance of the ultimate serving the trade has been willing to pay a premium price for crinkle cut potatoes when the strips are long and uniform as to length and cross section and the product substantially free of any pieces containing portions of the skin, eyes or other surface defects.

It is then a particular object of the present invention to provide an improved apparatus for economically preparing elongate strips of potatoes having a crinkle cut surface.

More particularly it is an object of the present invention to provide an apparatus for producing from potatoes or like vegetable products crinkle cut strips which are elongate and characterized by their regular rectangular cross section outline and freedom from any portions of the skin of the product.

Still another object is to provide an apparatus for forming elongate strips at the center portion of a potato or like vegetable product and automatically separating such strips from the outer, surface rounded portions of the product.

Another object is to provide an apparatus for the purpose described capable of operating substantially continuously without malfunction.

Still other objects and advantages of the present invention will become more apparent hereinafter.

The illustrated embodiment of the invention comprises a potato slicing mechanism having a series of three slab cutting or trimming stations each of which comprises a pair of parallel knives for trimming opposite surface portions of a potato to form an elongated rectangular cant of the center portion of the potato, means being provided to push a potato successively through such stations and to restrain the potato from rotation during its transfer from station to station. A pair of slicing stations are also provided for slicing such cant longitudinally. Each such slicing station comprises a plurality of cutting means, means being provided to guide and push the potato cant through the cutting means such that the cant is first sliced longitudinally in one direction and then sliced longitudinally in a direction at right angels to the first formed slices thus to reduce the cant into a plurality of elongate strips of rectangular cross section. The knives in all of the trimming and slicing stations are preferably provided with an undulating cutting edge in the transverse direction so that the cut surfaces likewise undulate, that is the strips have a "crinkle cut" surface. The pusher means for advancing the potato cant through the aforementioned slicing stages comprise slotted pushers, the desirability of which will be made more apparent hereinafter.

For more detailed description of the invention reference is made to the following drawings wherein:

FIGS. 1 to 6 are schematic perspective views showing the sequence of steps in the processing of a potato in the apparatus of the invention;

FIG. 7 is an edge view of a preferred configuration of the trimming and slicing knives utilized herein;

FIG. 8 is a perspective view of the final product strip formed by the apparatus of the invention;

FIG. 9 is a side elevation of an apparatus made in accordance with the invention;

FIG. 12 is an enlarged sectional view taken substantially along line 12—12 of FIG. 11;

FIG. 13 is a view of a fragmentary portion of the apparatus shown in FIG. 12 showing the same in another stage of the operation thereof; and FIG. 14 is a fragmentary sectional view taken along line 14—14 of FIG. 12.

Figure 10:
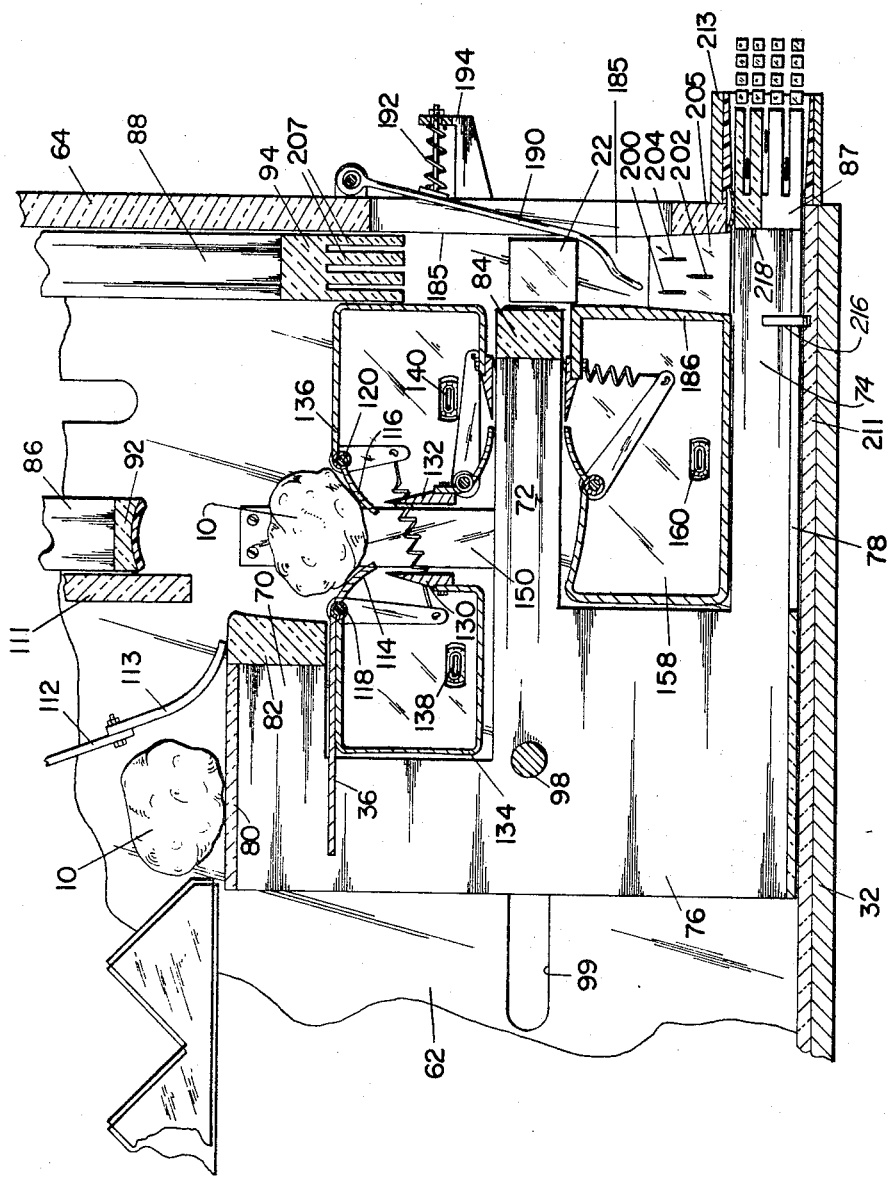
FIG. 10 is an enlarged fragmentary view partly in section showing the position of certain of the elements of the apparatus in one stage of the operation thereof.

Referring first to FIGS. 1 to 6 inclusive, as indicated by the potato 10 shown in FIG. 1, the variety of potatoes preferred for use for French frying are elongated in one direction and slightly oblate the transverse direction of their length. In accordance with the invention the potatoes to be processed are preferably prepeeled and then forced through a pair of knives to remove a pair of slabs 12 from the opposite elongate sides of the potato leaving opposite exposed surfaces 14 as shown in FIG. 2. For simplicity of illustration these surfaces are shown as plane as would be cut by a straight edge knife. However, as indicated previously herein preferably all of the cutting knives herein are of a sinuous form as shown in the edge view FIG. 7, so that the surfaces cut by such knives will have a corresponding sinuous or "crinkle cut" surface. Following the removal of the slabs 12 the potato 10 is passed through a pair of end slicing knives to remove end slabs 16 leaving exposed surfaces 18 on the potato. Thereafter the potato is moved in a direction at right angles to its previous direction of movement between a pair of knives which remove slabs 20 from the top and bottom surfaces, see FIG. 4, to leave a substantially rectangular billet or cant 22. It is not essential that all of the rounded surface portions of the potato be removed since a certain percentage of the final strips may be of irregular cross section. It is preferred, however, that the potatoes be so slabbed that a majority of the final strips will be of rectangular cross section.

As indicated in FIG. 5, the cant 22 is next moved downwardly past three vertically extending knives which slice the cant into four segments 24 and as a final step the segments 24 are simultaneously moved sideways through three parallel knives to form three horizontal cuts in each of the segments thereby further dividing the cant and forming it into sixteen elongate strips 26, FIG. 6, each of which is substantially rectangular cross section and each of which is provided with a crinkle cut surface on each of its six surfaces as more particularly shown in FIG. 8. The strips 26 may be processed for immediate use or may be partially deep fat fried and then frozen for subsequent use as desired.

Referring now more particularly to the views showing an apparatus of the invention and first to FIG. 9, the illustrated apparatus comprises a frame indicated generally at 30 mounted upon a base 32 which enables the device easily to be transported from one position to another. The apparatus includes a receiving station generally indicated at 34 (FIGURE 11) and comprising a plate 36 (FIGURE 10) on to which potatoes are adapted to be fed with their longer axis horizontal and substantially perpendicular to the plane of the drawing. Any suitable feed means may be utilized, the means illustrated herein comprising a conventional shauffle conveyor 40 driven from the motor 42 through a speed reducing device 44 and chain 46 running over suitable sprockets, not shown. The potatoes to be sliced are fed individually by any suitable means onto the endmost slot 48 of the conveyor 40 which operates in a well known manner to advance such potato stepwise toward the receiving station 34. The shuffle conveyor enables the inspection of the potatoes so that those with serious defects may be discarded by an operator. If desired a pair of end trimming blades 50 may be positioned on the opposite sides of the conveyor 40 to trim the ends of overlength potatoes as they advance along the conveyor.

The cutter assemblies and associated apparatus are mounted within a suitable housing comprising opposite side walls 60, 62 and end walls 64, 66 which preferably are formed of a transparent material such as a transparent plastic so that the operations of the mechanism will be visible from the exterior of the device. Movement of a potato through the apparatus of the invention is secured by means of pusher devices including three horizontally moving pusher devices 70, 72 and 74 formed as a unit by a pair of spaced apart side panels 76 which again may be formed of a transparent material to facilitate observation of the performance of the apparatus. The side panels 76 are maintained in spaced relation by a bottom strip or plate 78 and a top strip or plate 80 and other suitable spacers not shown. The forward ends of the pusher devices 70, 72 and 74 are transversely extending members indicated at 82, 84 and 87, respectively, which define pusher elements to engage the potatoes to effect movement thereof through the trimming and slicing stations.

The apparatus also includes a pair of vertically operating pusher devices indicated at 86 and 88 and which are defined by a pair of side panels 90 of transparent material joined by suitable transversely extending elements (not shown) and by transversely extending pusher members 92, 94 on the ends of the pusher devices, 86, 88 respectively. Means are provided for effecting reciprocation of the pusher means in timed relation with one another and with the shuffle conveyor 40. Referring to FIGS. 9 and 10, the pushers 70, 72, 74 are connected to a link 96 pivoted on a cross-rod 98 extending through the side panels 76 and outwardly through slots 99 in the side walls 60, 62. The links 96 are pivotally connected to the ends of crank arms 100 fixed to a shaft 101 suitably journaled in the upper portion of the frame 30. The shaft 101 is also connected to a crank 102 connected by a lever 104 to an eccentric (not shown) driven from the motor 42 through the speed reducing device 44. The vertical pushers 86, 88 are driven from crank arms 106 integral with the crank arms 100. The crank arms 106 are connected through links 108 to a cross rod 110 extending through the side panels 90 defining the pusher members 86, 88. The pushers 86, 88 are guided by the end wall 64 and a parallel wall 111 extending between the side walls 60, 62.

Figure 11:
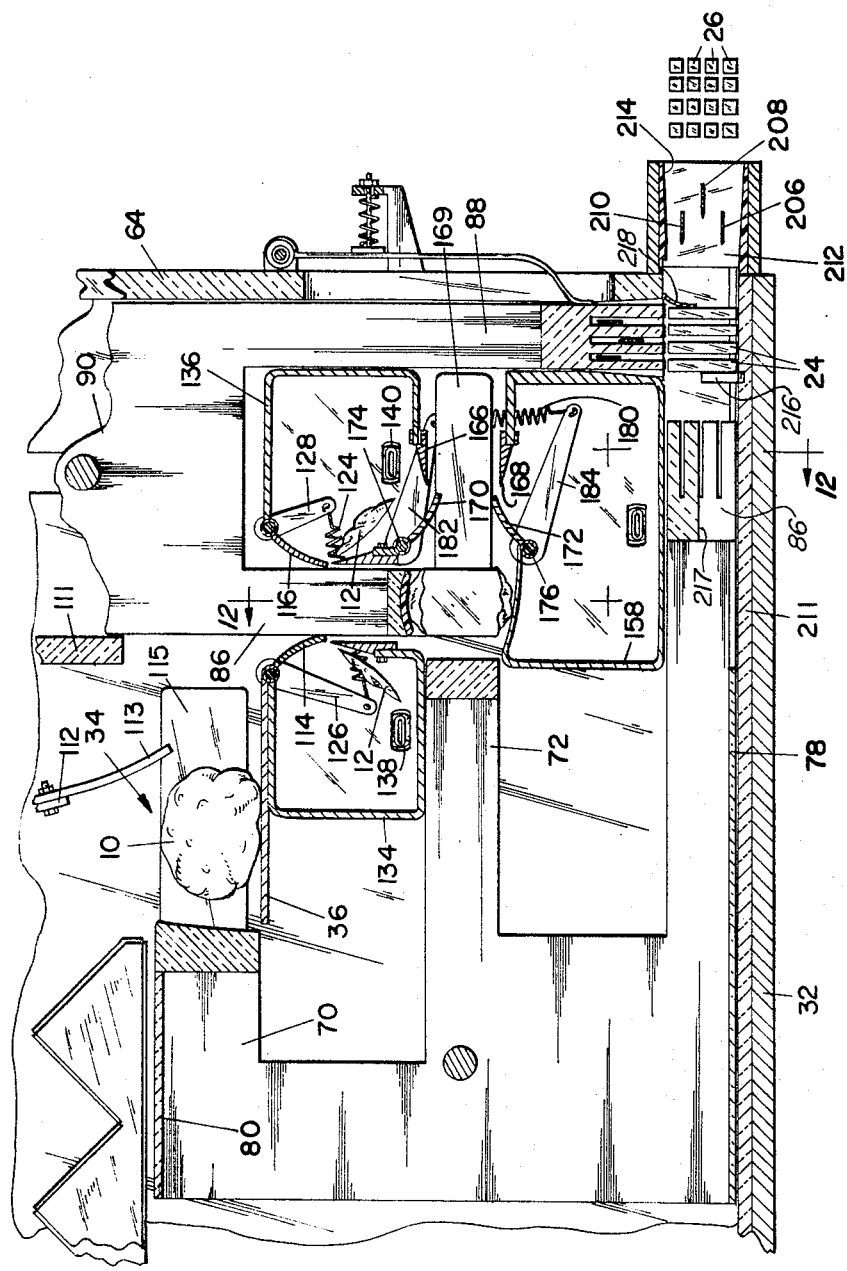
FIG. 11 is a view similar to FIG. 10 showing still another stage in the operation of the apparatus.

As shown in FIG. 10 the operation of the shuffle conveyor 40 is timed so as to deliver a potato therefrom when the pusher member 70 is in its forward position, that is, is in its position to the right as shown in FIG. 10. The potato thus falls upon the plate 80 defining the top of the pusher member 70 and is retained adjacent the end of the shuffle conveyor by a stop member 112 having a flexible lower strap portion 113. Upon retraction of the pusher member 70, that is, movement thereof to the left as shown in FIG. 11, the potato is free to fall upon the plate 36 of the receiving station. As the pusher makes its next cyclic forward movement the potato is engaged by the pusher head 82 and advanced between a pair of leaf springs 115 fixed at one end to the side panels 60, 62 so that the springs center the potato transversely of the side panels 60, 62. At the end of the stroke of the pusher 70 the potato is pushed off of the plate 36 and upon a centering device, see FIG. 10, comprising a pair of hinged flanges or leaves 114, 116 that are fixedly connected to pivot pins 118, 120, respectively, and which in turn are connected together by linkage indicated at 122 in FIG. 9 so that the leaves are caused to pivot simultaneously. The leaves 114, 116 are urged to an upper position as they are shown in FIG. 10 by a spring 124 connected between a pair of levers 126, 128 fixed to the ends of the pivot pins 118, 120 at the ends thereof opposite the ends to which the links 122 are connected. The leaves 114, 116 are mounted in centered relation with respect to a pair of side slab cutting blades 130, 132 so as to center a potato 10 therebetween. After the pusher member 70 reaches the end of its forward stroke it is immediately retracted and the pusher member 86 begins to descend whereupon the end 92 thereof engages a potato positioned on the leaves 114, 116 to push it downwardly and through the knives 130, 132. Preferably the surface of the pusher end 92 is contoured so as to be somewhat complemental to the surface of the potatoes 10 so as to apply substantially even pressure over the surface of the potato. Engagement of a potato upon the knives 130, 132 causes the same to be trimmed as shown in FIG. 2 and side slabs 12 to be severed therefrom. The side slabs 12 fall into troughs or flumes 134, 136 into which water may be injected by suitable means such as nozzles 138, 140 to cause the slabs to be carried away for processing as desired, as, for example, in the making of mashed potatoes or other treatment. As shown in FIGS. 10 and 11 the knives 130, 132 are suitably mounted on the flumes 134, 136 and the leaf supporting pins 118, 120 are also appropriately journaled thereon.

In the same downward stroke of the pusher 86 that pushes a potato past the side trimming knives 130, 132 the potato is pushed past a pair of end slab trimming knives 144, 146 as best shown in FIGS. 12 and 13. The knives 144, 146 are mounted on the lower ends of a pair of leaf springs 148, 150, respectively, which are fixedly mounted at their upper ends by suitable means such as bolts 152 upon the side walls 60, 62, respectively, so that the knives are urged toward one another in the normal condition of the springs as shown in FIG. 12 from which view the potato has been omitted. The knives 144, 146 are spaced inwardly from the corresponding spring a distance equal to the thickness of the end slabs 16 it is desired to trim from the potatoes, the knives being secured to the springs only along their side edges by brackets 153 whereby the severed slabs 16 may pass between the knives and supporting springs. Thus, as best shown in FIG. 13, the position of knives 144, 146 is automatically adjusted to the length of a potato descending between them so as to slice from each end thereof an end slab 16 (FIG. 3) of predetermined thickness equal to the spacing between the knife and the respective supporting spring therefor. The end slabs 16 severed from a potato fall or are pushed by the next succeeding potato downwardly between the corresponding knife and spring mount therefor and through openings 154, 156 in the top wall of a trough or flume 158 into which water is injected by means of a nozzle 160 to carry the severed slabs away. As indicated in FIGS. 12 and 14 the facing surfaces of the knives 144, 146 are provided with a plurality of projections 162 which are adapted to engage the fresh cut surfaces 18 on the potato ends to hold the potato therebetween with the surfaces 14, 18 extending substantially vertically, the stroke of the pusher 86 being such that it reaches its lower most position just below the upper edges of the knives 144, 146 or as shown in FIG. 12. At this time the pusher member 72 advances and engages the partially trimmed potato to advance it forwardly toward a pair of top and bottom slab trimming knives 166, 168.

To assure maintenance of the position of the potato laterally of the apparatus, arms 169 are fixed to the supports for the knives 144, 146 and extend forwardly toward the knives 166, 168. The springs 148, 150 maintain the arms in engagement with the flat end surface of the potato, until pusher member 72 reaches its forward most stroke position at which time springs 148, 150 move the arms together so that the vertical ends of arms 169 then contact the cant on the surface 14. Means are also provided for centering a potato substantially vertically with respect to the knives 166, 168. The illustrated means comprise a pair of centering flanges or leaves 170, 172 fixed to pivot pins 174, 176, respectively, suitably journaled in the flumes 136, 158 and connected by a linkage indicated at 178 so that pivoting of one leaf effects opposite pivoting of the other leaf. The leaves are urged to the position shown in FIG. 11 by a spring 180 extending between levers 182, 184 fixed to the ends of the pivot pins 174, 176. As a potato is advanced by the pusher 72 into engagement with the leaves 170, 172 it is pushed up or down as the case may be until it is substantially centered between such leaves as it impinges upon the knives 166, 168 which cut from the potato the top and bottom slabs 20 as indicated in FIG. 4. The top slab is forced upwardly into the flume 136 whereas the bottom slab falls into the flume 158. As is most evident in FIG. 11 the leaf 170 forms a part of the bottom wall of the flume 136.

Referring again to FIG. 10, at the forward end of the stroke of the pusher 72, the now substantially rectangular cant 22 is pushed over the top wall of the flume 158 and falls downwardly into a chanel 185 for the pusher member 88 defined between the end wall 64 of the housing and the end wall 186 of the flume. To hold the cant in an aligned position a spring biased arm 190 is hingedly mounted on the plate 64 so as to engage the cant 22 and press it against the vertical surface of the flume wall 186 as shown in FIG. 10. The arm 190 is suitably biased by means of a spring 192 arranged between the arm and a bracket 194. The arms 169 terminate just short of the channel 185 and the end of the stroke of the pusher 72 whereby as the potato cant clears the end of such arms they swing together so as to form a stop against which the cant 22 may be pressed by the arm 190 should it not fall into the channel.

Positioned in the lower end of the channel 185 immediately above the path of movement of the pusher 74 are three cutting knives 200, 202, 204 suitably supported in a pair of blade supports 205, mounted in the walls 60, 62 in any suitable manner to permit removal of the supports and knives as a unit for repair or replacement thereof. The pusher 88 is provided with laterally extending slots 207 in the end 94 thereof defining fingers between which the knives may be received in the lowermost position of the pusher as best shown in FIG. 11. As the pusher 88 descends it engages the potato cant 22 to force the same down and past the knives 200, 202, 204 thereby effecting slicing of the cant into the segments 24 as shown in FIG. 5. Preferably the side walls defining the channel 185 flare outwardly in the area of the knives to permit lateral separation of the segments as they are forced past the knives. Preferably also the knives are staggered as shown in FIGS. 10 and 11 so that wedging of the segments between the knives will not occur. As shown in FIG. 11 the pusher 88 reaches its lowermost position and the severed segments are deposited upon a bottom plate 211 when the pusher 74 is in its retracted position. To maintain the segments 24 in an upright position a pair of supporting devices are provided including a rigid vertical rod 216 fixed to the plate 211 and positioned so that the segments 24 are placed on the plate 211 immediately forwardly of the rod. Thus the rod 216 prevents the segments from tipping toward the pusher arm 74 which is provided with a vertical slot 217 to accommodate the rod during the forward stroke of the arm. To prevent the segments from tipping in the opposite direction wire springs 218 are fixed to the wall 64 in such a manner that they will have a normal position extending angularly downwardly into the path of the descending segments, as indicated in dotted lines in FIG. 11, whereupon the springs will be displaced as the segments are deposited on the plate 211 and exert sufficient force on the segments to prevent their tipping forwardly. As the pusher 74 moves forwardly, the springs 218 are forced upwardly out of the path of the segments as shown in FIG. 10.

The segments deposited on plate 211 are engaged by the pusher 74 upon its next forward stroke and moved forwardly past a second set of suitably mounted transverse knives 206, 208, 210 extending transversely of the device but at right angles with respect to the knives 200, 202, 204. Such knives are suitably mounted between a pair of blade supporting end plates 212 removably secured within a housing 213 projecting forwardly of end wall 64 and defining a channel for the knives. The pusher end 87 is also sloted as shown in FIGS. 10 and 11 to accommodate the knives 206, 208, 210 and as the pusher forces the potato segments 24 past the knives the same are sliced longitudinally to form the cant 22 into sixteen elongate substantially rectangular strips. As indicated in FIGS. 10 and 11 the top and bottom walls of the channel in which the knives 206, 208, 210 are positioned flare outwardly to accommodate the expansion of the segments as they are sliced and preferably a lining 214 of low friction material is placed on the top and bottom wall. A flume or trough 216 of flowing water is provided to receive the severed strips as they emerge from the device so as to carry them to other processing mechanism such as for blanching, freezing or to other treatment.

While three slicing knives are shown in each station obviously and desired number may be used. As indicated previously all of the knives embodied in the device preferably are sinuous as shown in FIG. 7, but they may be straight edge knives. The grooves of the pusher ends 86, 94 are, of course, of a sufficient width to accommodate the knives whether they are straight or of the sinuous type.

It will be apparent from the foregoing that in the apparatus of the invention a product is automatically moved progressively through the apparatus from station to station, a number of products being processed simultaneously in the various stages of the apparatus but each being moved individually by a pusher means. This is desirable in that between strokes of a pusher the knives may return to their initial, normal position in the event any deflection occurred during passage of a product through a stage. It will also be apparent the apparatus functions automatically to trim the outer portions of a product from the center part thereof and to separate such trimmed portions whereby finally a plurality of uniform strips of a product of maximum length are obtained free of substantially all skin and surface defects of the product. For certain purposes it may not be necessary to square the end of the product, in which case the end trimming knives 144, 146 may be omitted. While the invention has been described with particular reference to the processing of potatoes it will be apparent that the principles thereof are applicable to similar processing of other vegetable products.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. In a cutting mechanism for cutting a vegetable product such as a potato, a receiving station, feed means for feeding vegetable products individually to said receiving station in a position of predetermined alignment, a first slab cutting station having a pair of parallel cutting means for slicing slabs from opposed sides of a product pushed therethrough, centering means between said receiving station and said first cutting station for centering a potato with respect to said cutting means, pusher means for pushing said product from said receiving station through said first cutting station, an end cutting station having a pair of parallel cutting means for slicing the opposite endmost portions of said product therefrom, means between said first slab cutting station and said end cutting station in position for receiving potatoes emerging from said first slab cutting station and for centering said potatoes lengthwise with respect to said end cutting station cutting means and preventing said product from rotating.

pusher means for pushing said potatoes through said end cutting station, a second slab cutting station having a pair of parallel cutting means extending perpendicular to the cutting means of said first cutting station for slicing slabs from the sides of a potato at right angles to those cut in said first cutting station, centering means between said end cutting station and said second slab cutting station for centering potatoes with respect to the cutting means of said second slab cutting station, and pusher means for pushing said potatoes through said second slab cutting station.

2. In a cutting mechanism as set forth in claim 1, a trough means adjacent each of said cutting means for receiving the severed slabs, and means for inducing a flow of water in said trough to convey the product away from said cutting means.

3. In a cutting mechanism for cutting a vegetable product such as a potato, a receiving station, feed means for feeding vegetable products individually to said receiving station in a position of predetermined alignment, a first slab cutting station having a pair of parallel knives for slicing slabs from opposed sides of a product pushed therethrough, centering means between said receiving station and said first cutting station for centering a product laterally with respect to said cutting means, pusher means for pushing said product from said receiving station through said first cutting station, an end cutting station having a pair of parallel knives for slicing the opposite endmost portions of said product therefrom, means between said first slab cutting station and said end cutting station in position for receiving said product emerging from said first slab cutting station and for centering said product lengthwise with respect to said end cutting station cutting means and preventing said product from rotating, pusher means for pushing said product through said end cutting station, a second slab cutting station having a pair of parallel knives extending perpendicular to the cutting means of said first cutting station for slicing slabs from the sides of a product at right angles to those sides cut in said first cutting station, pusher means for pushing said product through said second slab cutting station, centering means between said end cutting station and said second slab cutting station for centering said product with respect to the cutting means of said second slab cutting station, a first slicing station having a plurality of parallel knives for slicing the center portion of a product trimmed in the preceding stations into a plurality of elongate segments, pusher means for pushing a product through said first slicing station, a second slicing station having a plurality of parallel knives perpendicular to the knives of said first slicing station for slicing the elongate segments formed in said first slicing station into a plurality of elongate strips, pusher means for pushing said segments through said second slicing station, means for driving all of said pusher means in synchronized relation, said pusher means for said slicing stations having finger like elements for interleaving with the respective knives so as to push a product entirely through the corresponding set of knives, each of said pusher means being arranged directly to engage a product and push the same through the corresponding cutting or slicing station.

4. Apparatus as set forth in claim 3 wherein each of said knives is formed with an undulating cutting edge.

5. In a cutting mechanism for severing predetermined amounts from the opposite ends of vegetable products of random dimension, a pair of substantially parallel spaced apart flat spring members fixedly mounted at one end thereof, the opposite ends of said spring members being movable forward and away from each other, a pair of parallel knives mounted one on each of said spring members on the said opposite ends thereof, said knives being spaced inwardly from the respective spring member toward the opposite member so as to provide clearance space between each said knife and spring member on which it is mounted, the facing side surface of said knives being formed with a plurality of projections to engage the end faces of the product formed by the cut so as to hold said product between said knives, and pusher means for pushing a product between said springs and through said knives whereby the engagement of the ends of said product with said springs will force them apart so as automatically to move said knives apart and effect severing of a slab from each end of said product equal in width to the spacing between a knife and the spring to which it is attached.

6. In a vegetable cutting mechanism for trimming the exterior portions of a vegetable product to provide a rectangular cant thereof free of surface portions of the product, a first set of fixedly mounted upwardly facing trimming knives, a second set of upwardly facing trimming knives disposed below said first set of knives and extending at right angles thereto, resilient means mounting said second set of trimming knives for movement toward and away from each other and urging said knives toward each other, means on the facing side surface of said second set of knives for engaging a product forced between the two.

a pusher means having a vertical stroke for forcing a product downwardly through said first set of knives and to said second set of knives, the lower terminus of the stroke of said pusher means being below the upper cutting edges of said second set of knives so as to push a product past said knives but so as to permit a product to be engaged and retained by said product engaging means on said second set of knife surfaces.

a second horizontally movable pusher means for engaging a product engaged between said second set of knives and moving the same horizontally from between said second set of knives, a third set of trimming knives disposed to one side of said second set of knives, the edges of said third set of knives extending horizontally on opposite sides of the path of movement of said pusher means to engage a product moved by said second pusher means from between said second set of knives.

7. The apparatus of claim 6 comprising a first slicing station following said first set of trimming knives, said first slicing station having a plurality of parallel knives for slicing the center portion of a product trimmed in the preceding stations into a plurality of elongated segments, pusher means for pushing a product through said first slicing station, a second slicing station having a plurality of parallel knives perpendicular to the knives of said first slicing station for slicing elongate segments formed in said first slicing station into a plurality of elongated strips, and pusher means for pushing said segments through said second slicing station.

8. In a vegetable cutting mechanism for trimming the exterior portions of a vegetable product to provide a rectangular cant thereof free of surface portions of the product, a first pair of fixedly mounted parallel trimming knives, a second pair of trimming knives disposed in line with said first pair of knives and extending at right angles thereto, resilient means mounting said second pair of trimming knives for movement toward and from each other and urging said knives toward each other, means on the facing side surfaces of said second pair of knives for engaging a product forced between the two, a first pusher means having a stroke for forcing a product through said first pair of knives and between said second pair of knives, the terminus of the stroke of said pusher means being beyond the cutting edges of said second pair of knives so as to push a product past said knife edges but so as to permit a product to be engaged and retained by said product engaging means on said second pair of knives surfaces, a second pusher means for engaging a product engaged between said second pair of knives and moving the same in a direction at right angles to the movement of said first pusher means from between said second pair of knives, and a third pair of trimming knives disposed to one side of said second pair of knives, the edges of said third pair of knives extending on opposite sides of the path of movement of said pusher means to engage a product moved by said second pusher means from between said second pair of knives,

References Cited

UNITED STATES PATENTS

| | | | |
|---|---|---|---|
| 690,512 | 1/1902 | Boos | 146—169 |
| 1,671,723 | 5/1928 | Jagenburg | 146—6 |
| 2,291,449 | 7/1942 | Burgess et al. | 146—169 |
| 3,109,468 | 11/1963 | Lamb et al. | 146—78 |
| 3,217,768 | 11/1965 | Lamb | 146—241 |

FOREIGN PATENTS 650,653  2/1951  Great Britain.

WILLIAM W. DYER, JR., *Primary Examiner.*

W. GRAYDON ABERCROMBIE, *Examiner.*